(12) United States Patent
Kustosch

(10) Patent No.: US 6,938,609 B2
(45) Date of Patent: Sep. 6, 2005

(54) METHOD AND DEVICE FOR CONTROLLING THE DRIVE UNIT OF A MOTOR VEHICLE

(75) Inventor: Mario Kustosch, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 125 days.

(21) Appl. No.: 10/240,406

(22) PCT Filed: Feb. 13, 2002

(86) PCT No.: PCT/DE01/00537

§ 371 (c)(1),
(2), (4) Date: Sep. 30, 2002

(87) PCT Pub. No.: WO01/73281

PCT Pub. Date: Oct. 4, 2001

(65) Prior Publication Data

US 2003/0150421 A1 Aug. 14, 2003

(30) Foreign Application Priority Data

Mar. 28, 2000 (DE) .......................... 100 15 320

(51) Int. Cl.$^7$ .............................................. F02D 43/04
(52) U.S. Cl. .................... 123/333; 123/335; 123/350; 123/351
(58) Field of Search ................ 123/333, 335, 123/350, 351

(56) References Cited

U.S. PATENT DOCUMENTS

| | | | | |
|---|---|---|---|---|
| 3,563,219 A | * | 2/1971 | Mieras | 123/335 |
| 3,738,340 A | * | 6/1973 | Olson | 123/335 |
| 4,262,641 A | * | 4/1981 | Mosely et al. | 123/335 |
| 4,311,124 A | * | 1/1982 | Schulzke | 123/333 |
| 4,375,207 A | * | 3/1983 | Sieber et al. | 123/333 |
| 4,886,140 A | * | 12/1989 | Leiber et al. | 123/333 |
| 5,009,208 A | * | 4/1991 | Fiorenza, II | 123/335 |
| 5,251,598 A | * | 10/1993 | Wietelmann | 123/339.21 |
| 5,775,290 A | * | 7/1998 | Staerzl et al. | 123/335 |
| 6,134,499 A | * | 10/2000 | Goode et al. | 123/333 |

FOREIGN PATENT DOCUMENTS

| | | |
|---|---|---|
| DE | 38 05 488 | 9/1988 |
| DE | 42 39 711 | 6/1994 |
| DE | 195 06 082 | 8/1996 |
| DE | 195 36 038 | 4/1997 |
| DE | 197 42 083 | 3/1999 |
| DE | 199 13 272 | 9/2000 |

* cited by examiner

Primary Examiner—Erick Solis
(74) Attorney, Agent, or Firm—Walter Ottesen

(57) ABSTRACT

A method and arrangement for controlling the drive unit of a vehicle is suggested wherein a limiter is provided to limit the engine rpm to a pregiven limit value in at least one operating state. The limiter is controlled to be ineffective in this at least one operating state in dependence upon at least one additional operating variable.

13 Claims, 4 Drawing Sheets

METHOD AND DEVICE FOR CONTROLLING THE DRIVE UNIT OF A MOTOR VEHICLE

This application is the national stage of PCT/DE 01/00537, filed on Feb. 13, 2001, designating the United States.

FIELD OF THE INVENTION

The invention relates to a method and an arrangement for controlling the drive unit of a vehicle.

BACKGROUND OF THE INVENTION

From U.S. Pat. No. 5,692,472, a method and an arrangement for controlling an internal combustion engine are known wherein a maximum permissible torque is formed for ensuring the operational reliability of the engine control. This maximum permissible torque is formed at least on the basis of the position of an operator-controlled element actuable by the driver. This maximum permissible torque is compared to an actual torque of the engine. If the actual torque exceeds the maximum permissible torque, then it is assumed that there is a defective function of the control and measures are initiated to react to the fault until the actual torque again drops under the maximum permissible torque. This torque monitoring is greatly dependent upon the quality of the detection of the actual torque. To improve the monitoring of the control of the engine, there was a supplement made in U.S. Pat. No. 6,032,644 in that this torque monitoring is switched off in specific operating situations. In this case, the fuel metering is cut off if the engine rpm exceeds a pregiven engine rpm for a specific position of the accelerator pedal.

In addition, an rpm limiter is presented in the published German patent application 199 13 272 wherein the engine rpm is limited to a pregiven monitoring rpm. This limiting is especially active when the accelerator pedal is not depressed. For active limiters, adaptations are necessary in at least some applications with respect to the performance of the limiter or with respect to the driving comfort.

An example is known from U.S. Pat. No. 5,558,178 as to how a desired torque value is converted into control variables for influencing the charge of the engine, the ignition angle and/or into a number of cylinders to be suppressed.

SUMMARY OF THE INVENTION

The described measures improve the comfort as well as the effect of the limiter. It is especially advantageous that the interrelationship of the limiter with other functions of the engine control is considered. In this way, it is ensured that the limiter and the idle controller and/or the limiter and the travel comfort functions (for example, dashpot function, load impact damping, jolt damping, et cetera) do not operate against each other, and in this way, affect the driving comfort or the action of the limiter.

In an especially advantageous manner, the integrator, which is used in the limiter, is limited. In a preferred embodiment, a limit value which is below the negative value of the input value for a control variable of the drive unit (for example, the torque desired value) is used. In this way, it is ensured that this input value can never be less than zero. The generation of a negative torque of the drive unit (braking operation) for an active limiter and the loss and comfort associated therewith is effectively avoided.

It is also advantageous that the limiter is only active when at least one present driving comfort function is ended. In combination with a function, which smoothes (dashpot function) the transition when releasing the accelerator pedal, it is avoided that the limiter suddenly limits the engine torque when the driver releases the foot from the accelerator pedal with the clutch engaged and at high speed so that a soft transition into the operating range of the limiter is ensured.

A further advantageous improvement is in the use of a controlled integrator in lieu of a PID controller for limiting rpm. The advantage is that one can pregive the operation of the integrator in dependence upon the operating state of the system (rising, falling, constant) and, in this way, prevent vibration which can occur because of the interaction of the integrators of the rpm limiter and the idle controller.

Furthermore, it is advantageous that a decoupling of the effective ranges of idle controller and limiter is provided by means of an rpm-dependent characteristic line. With the weighting of the output signal of the limiter in dependence upon the rpm, the effect of the limiter is reduced or disabled in rpm regions wherein, as a rule, the idle controller operates for maintaining the desired idle rpm. In rpm regions, which lie close to the monitoring rpm, the limiter is permitted to be fully effective. In this way, the function ranges of both functions are essentially decoupled so that they do not mutually disadvantageously affect each other.

With the improvements, the advantages of the monitoring rpm limiter are maintained in an advantageous manner. The advantages of the monitoring rpm limiter are: the independence of scattering of individual engines, the service life of the engine and the ambient conditions (temperature, elevation above sea level, et cetera) which are present in each case. The limiter reduces the complexity of application because not each characteristic value need be considered in the monitoring. The characteristic variable operates to increase torque as may be required in the case of a fault. For this reason, the development process is simplified because the introduction of new characteristic variables is simplified which need not be considered in the monitoring. Furthermore, the use of the limiter is independent of the type of control system; for example, this is so whether the system is a system having intake manifold injection, a system with gasoline direct injection, a control system for a diesel engine or for an alternative drive concept (electric motor, et cetera).

BRIEF DESCRIPTION OF THE DRAWINGS

The invention is explained in greater detail with respect to the embodiments shown in the drawing.

DESCRIPTION OF THE PREFERRED EMBODIMENTS OF THE INVENTION

Figure 1:
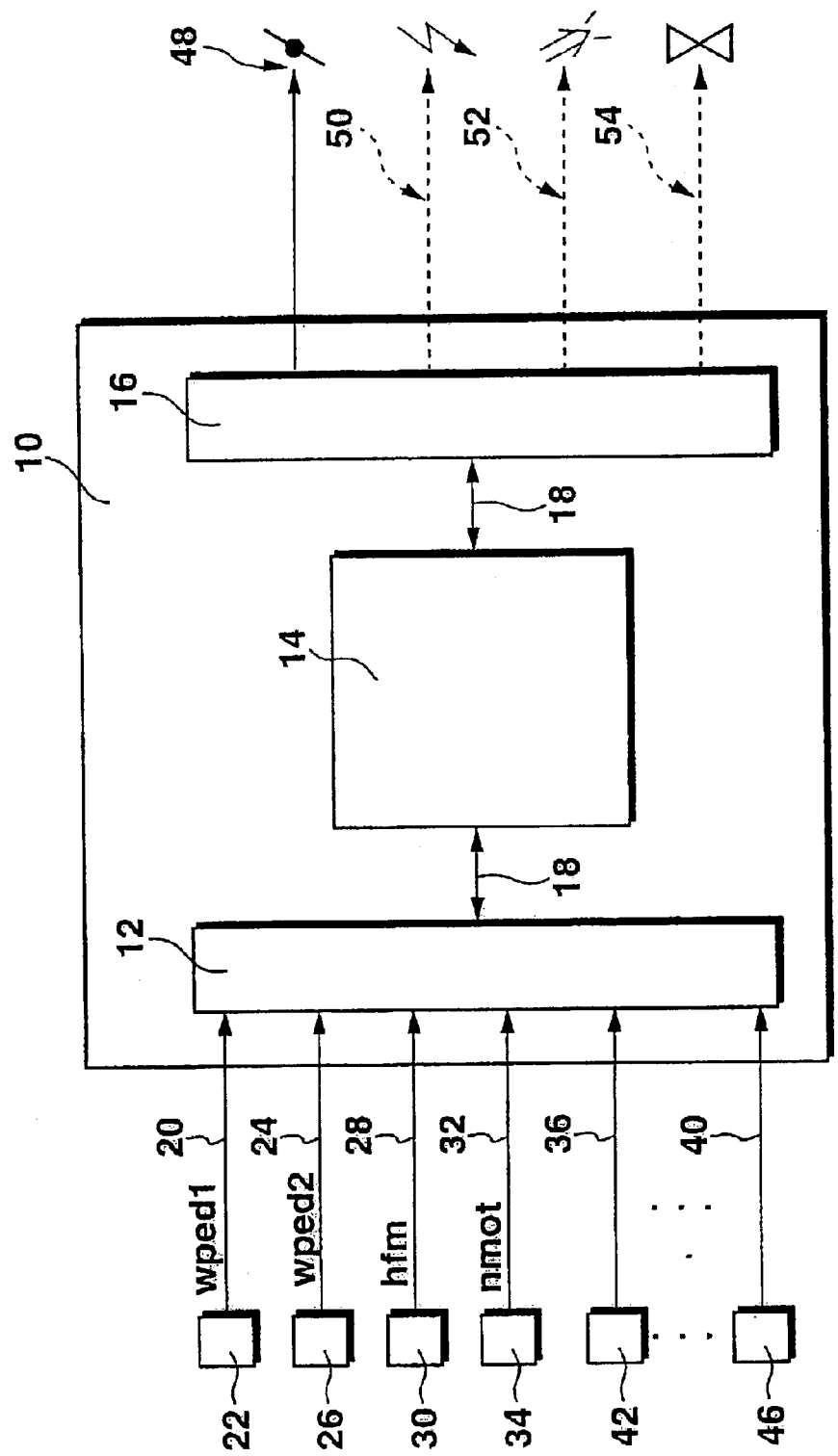
FIG. 1 shows a block circuit diagram of a control system for an internal combustion engine; whereas in FIGS. 2 and 3, sequence diagrams are shown, which outline a program of at least one microcomputer of the control system and wherein an advantageous embodiment of the limiter is shown.

FIG. 1 shows an electronic control unit 10 which includes at least an input circuit 12, at least one microcomputer 14 and at least an output circuit 16. Input circuit, microcomputer and output circuit are connected to each other for mutual data exchange via a communications system 18. The following input lines lead to the input circuit 12: an input line 20 from a measuring device 22 for detecting the accelerator pedal position wped; an input line 24 from a measuring device 26 for detecting the throttle flap position wdk; an input line 28 from a measuring device 30 for detecting the air mass hfm, which is supplied to the engine; an input line 32 from a measuring device 34 for detecting the engine rpm nmot; and, input lines 36 to 40 from measuring devices 42 to 46 for detecting additional operating variables of the engine and/or of the vehicle which are needed for carrying out the engine control or from which such operating variables are derived such as intake air temperature, ambient pressure, et cetera. The electronic control unit 10 controls power parameters of the engine via the output circuit 16. Accordingly, the charge of the engine is controlled by influencing the air supply to the engine via a throttle flap 48. In addition, the ignition time point 50 is set and the fuel metering 52 is influenced and/or a turbo charger 54 is controlled.

The principal operation of the preferred embodiment of an engine control, which is carried out by the control unit 10, is known from the state of the art mentioned initially herein. A desired value for a torque of the engine is determined at least on the basis of the accelerator pedal wped and this desired value corresponds to the driver command. This desired value is converted into a torque desired value while considering other desired values, as may be required, of external and internal functions such as drive slip control, rpm limiting, speed limiting, et cetera. The torque desired value is converted into a desired value for the charge (that is, for the relative air charge per cylinder stroke standardized to a maximum possible cylinder charge) while considering the engine rpm in corresponding characteristic fields, tables or computation steps. At least a desired throttle flap position value is determined in dependence upon this desired charge value while considering the physical interrelationships in the intake manifold. The desired value is then adjusted by a corresponding control loop. Furthermore, at least the ignition angle and/or the fuel metering is influenced while considering, as may be required, the actual torque which is, for example, computed on the basis of the air mass signal. The actual torque is then brought up to the desired torque. Ancillary to the above, in one embodiment, the torque comparison outlined initially herein is carried out by the control unit 10 with the pregiven fault reaction measure.

The description of the limiter which follows is however not limited to the use in the context of this engine control; rather, the limiter is used with the corresponding advantages everywhere where a control input variable is formed in dependence upon at least the position of an operator-controlled element actuable by the driver (torque, power, rpm, throttle flap angle, et cetera).

Figure 2:
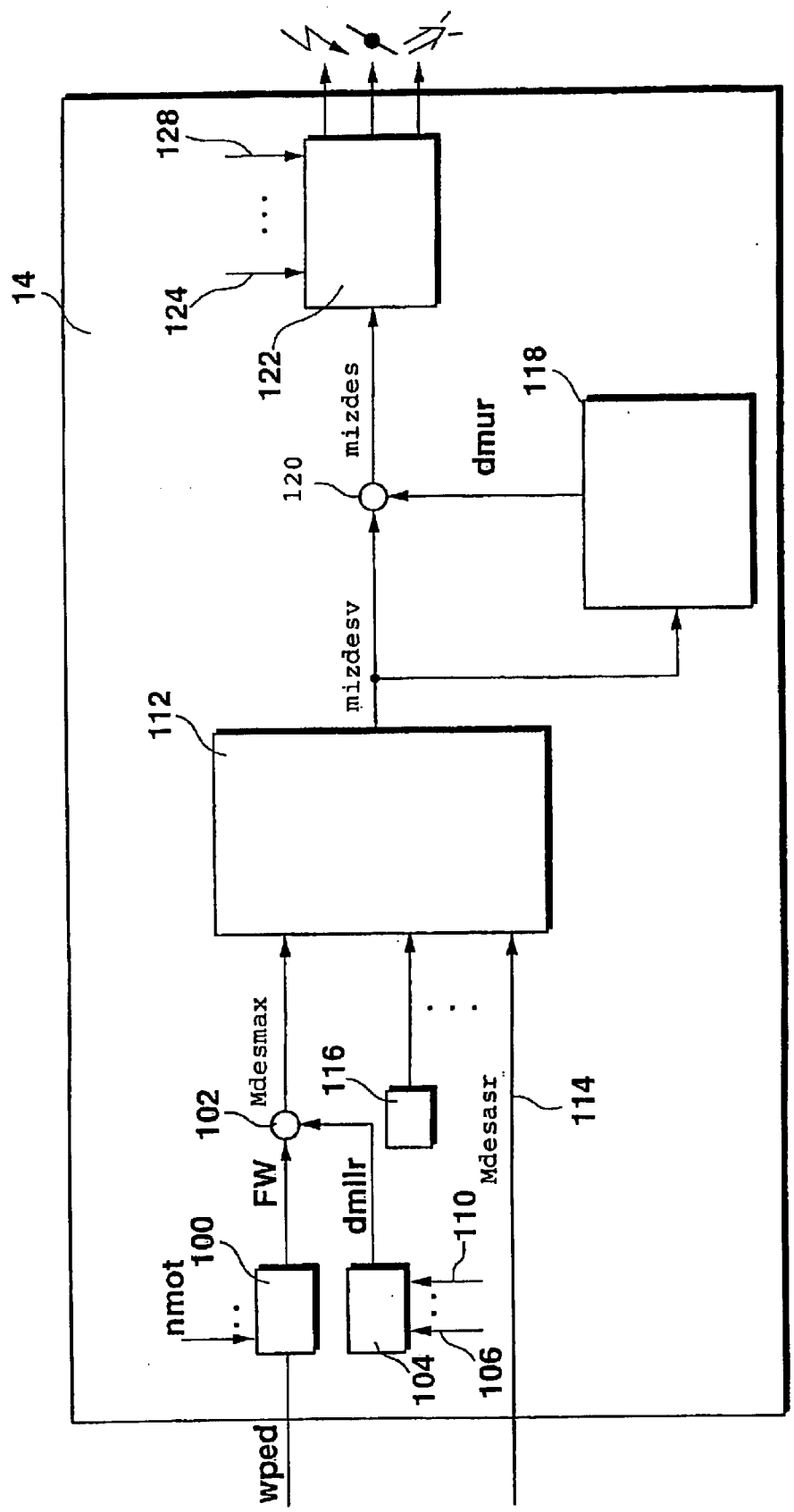

In addition, an rpm limiter is used which limits the engine rpm to a pregiven monitoring rpm by reducing the input quantity. The monitoring rpm is preferably dependent upon the accelerator pedal position or the driver input variable for the control quantity (for example, the driver command torque). In FIG. 2, an overview sequence diagram is shown which shows the principal connection of the rpm limiter into the torque structure for controlling a drive unit. The torque structure is described in the initially mentioned state of the art. The corresponding connection takes place in control systems on the basis of one of the above mentioned other physical parameters.

In the characteristic field 100, the driver command torque FW is formed on the basis of the accelerator pedal position wped and additional operating variables such as the engine rpm nmot. The driver command torque FW is logically coupled to the output value DMLLR of an idle controller 104 in a logic element 102. The idle controller is a conventional idle controller which forms a desired idle rpm in dependence upon operating variables (see 106 to 110). The idle controller compares the desired idle rpm to the actual rpm and generates an output signal in dependence upon the deviation between the two values in accordance with a pregiven control strategy. This output signal is superposed as a torque correction DMLLR onto the driver command FW in the logic element 102. The corrected driver command torque is supplied to a coordinator 112 to which desired torque values 114 of external systems are also supplied. The external systems include, for example, a drive slip control, an engine drag torque control, a transmission control, et cetera, as well as desired torque values of internal functions such as a maximum rpm limiting 116, a torque limiting, et cetera. On the basis of the supplied desired torque values, the coordinator 112 selects, in accordance with a pregiven strategy, a resulting desired torque value MIZDESV. This desired torque value MIZDESV is supplied to the rpm limiter 118. On the basis of this signal as well as additional operating variables (which are described hereinafter with respect to the sequence diagram of FIG. 3), the rpm limiter 118 determines a corrective value DMUR with which the resulting desired torque MIZDESV is to be corrected in order to maintain the pregiven limit rpm. This corrective value is superposed onto the desired torque value in the logic element 120 and is preferably added and, in this way, the torque desired value MIZDES is formed. This value is supplied to the control variable former 122 which forms control variables for the control of the ignition angle, the fuel metering, the air supply, et cetera in dependence upon operating variables (124 to 128) and on the desired torque value, for example, in the manner described in the state of the art mentioned initially herein; whereby, the torque of the drive unit is brought essentially to the pregiven desired torque value.

Figure 3:
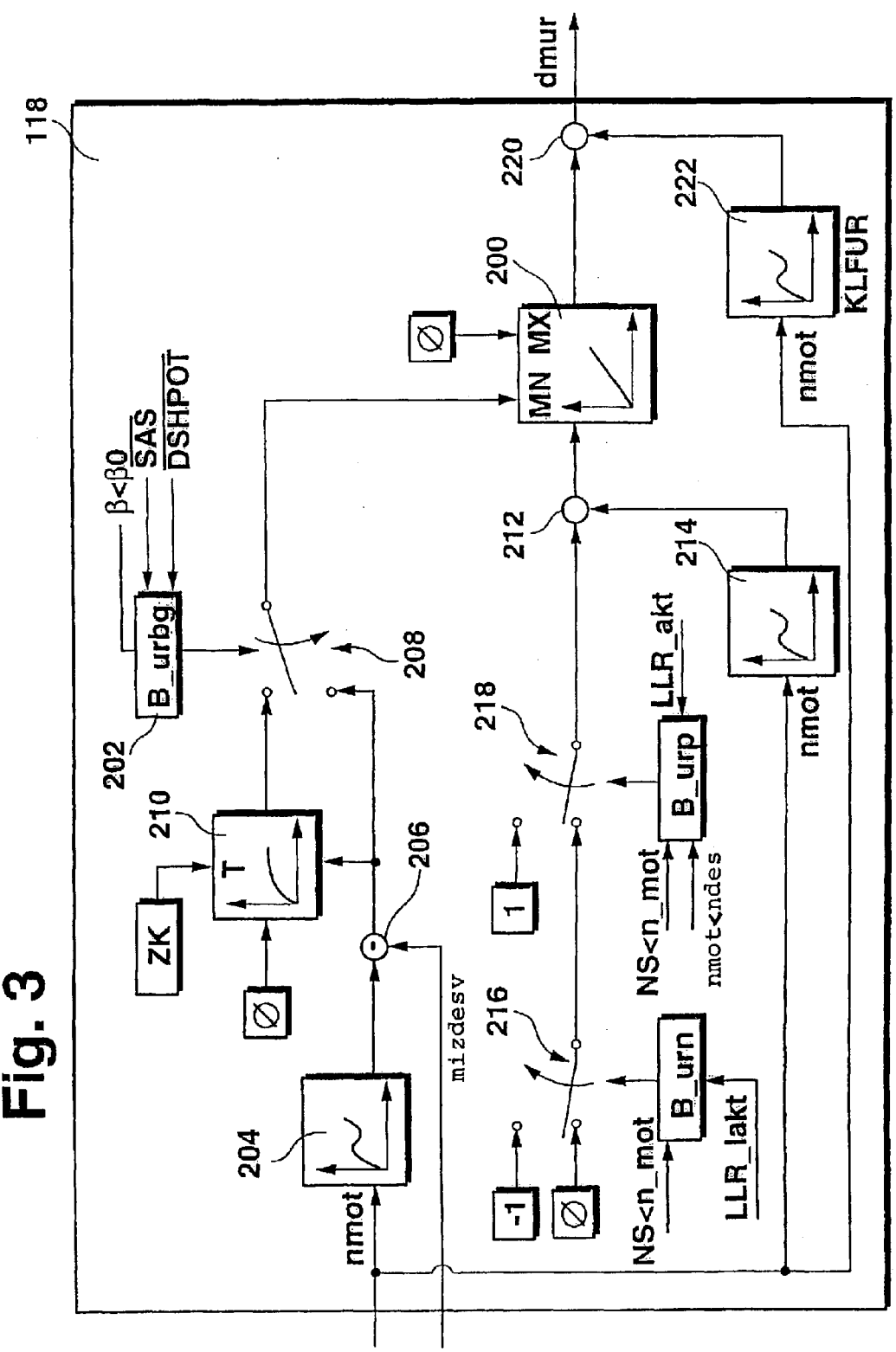

FIG. 3 shows a sequence diagram of a preferred embodiment of the rpm limiter 118. The sequence diagram sketches a program of the microcomputer 14 wherein the individual blocks show the program steps or program elements and the connecting lines show the flow of information.

At least the engine rpm nmot and the desired torque MIZDESV formed by the coordinator are supplied as input variables to the limiter 118. In the preferred embodiment, the limiter 118 effects a limiting of the desired torque when the accelerator pedal is not depressed so that an applicable engine rpm NS (for example, 1500 rpm per minute) is not exceeded. The output quantity of the limiter DMUR defines a correcting intervention into the torque desired value. What is essential is that the effect of the limiter is controllable in dependence upon at least one further operating variable (operating conditions B_URP, B_URN, B_URBG, NMOT-dependent characteristic line).

An essential element of the limiter is a controllable integrator 200. The integrator value is limited to a maximum value MX and a minimum value MN. The integrator is controlled because its input signal is switchable between the values 0, 1 and −1 and, in this way, the operation of the integrator (increasing, falling, constant) is pregiven in dependence upon the particular operating state of the system. Interactions between the limiter and the integrator of the idle controller and the vibrations arising therefrom in the system are prevented.

The upper limiting of the integrator 200 is basically zero. The minimal limit is, in one operating state, MIZDESV. This value is still corrected in dependence upon rpm. In this way, the integrator value cannot leave its effective range. With the limiting of the minimum value to the negative value of the desired input in at least one operating state, the lower limit is always so adjusted that the outputted desired input cannot be less than 0. The minimum limiting value of the integrator 200 is fixed in dependence upon a pregiven operating condition B_URBG (see 202) either to the value zero or to the rpm-dependent corrected desired input.

There is a switchover between the two limit values by means of a switching element 208 in dependence upon the presence of the condition B_URBG. The switching element is switched from the position shown into its second position when the condition is present. The condition B_URBG is present when the accelerator pedal has reached its idle position and no fuel shutoff takes place in overrun operation and no comfort function (for example, a dashpot function) is active.

If these conditions are present, a value is determined on the basis of the current engine rpm by means of a characteristic line 204. The desired value MIZDESV is subtracted from this value in the difference element 206. The characteristic line 204 is pregiven in such a manner that it contains the trace of the minimum indicated torque in dependence upon the rpm for which, at minimum charge and retarded ignition angle, a combustion of the mixture just takes place. The result of the subtraction is supplied as minimum value to the integrator 200 via the switching element 208. In at least one operating point, the output of the characteristic line is 0 so that the negative value of the desired value input is present as a minimum value.

If one of the above conditions is not satisfied (that is, if the switching element is in the position shown), then the output value of a lowpass filter 210 is pregiven as minimum limit value. This has a time constant ZK and its input value is always 0. Accordingly, when the condition signal B_URBG changes, the lowpass filter is initialized with the output signal of the differentiating element 206 and the limit value is set to the value 0 by the lowpass function. Operationally, this means that an output signal of the integrator 200, which is different from 0, can occur only with the presence of the condition signal B_URBG. If this condition is not satisfied, the minimum value approaches the maximum value with the aid of the lowpass filter so that the value of the integrator 200 is 0.

Furthermore, the limiter is only activated when no driving comfort function, such as a dashpot function, is active and the idle is recognized at the accelerator pedal. This prevents a jolt-like limiting of the engine torque taking place as a consequence of an active dashpot function when there is a sudden release of the accelerator pedal and the clutch of the vehicle is engaged and there is high speed. In this way, the driving comfort of the vehicle is maintained.

The input variable of the integrator is formed in a multiplier 212. The output signal of a characteristic line 214 is supplied to this multiplier. The characteristic line 214 is dependent upon the engine rpm and represents the trace of the amplifying factor of the integrator. An example for this characteristic line includes output values (torque per time) outside of the idle rpm range with these output values increasing continuously with rpm. The second input signal of the multiplier 212 is the value 0, the value −1 or the value +1 depending upon the operating condition. The value 0 is supplied to the multiplier 212 when a switch 216, which is switched in dependence upon the condition signal B_URN, as well as a switch 218, which is switched in dependence upon the condition signal B_URP, is in the position shown. If the switch 218 is in its position not shown, then the input value is 1. If the switch 218 is in the position shown and the switch 216 is in the position not shown, then the input signal is the value −1.

The signal B_URP is present when: the engine rpm nmot is less than the limiting rpm NS, lies below the idle rpm NDES and the idle controller is active. If these conditions are satisfied, the condition signal B_URP is generated and the switch 218 is switched into the position not shown so that the value 1 is supplied to the multiplier 212.

The switch signal B_URN is present when the engine rpm is greater than the monitoring rpm NS or the integral portion of the idle controller is active. If this is the case, then the switch element 216 is switched into the position not shown and the value −1 is supplied to the multiplier 212 for the corresponding position of the switch element 218.

If none of the above signals is present, then the input signal of the multiplier 212 and therefore the input signal of the integrator 200 is zero.

The condition signal B_URP shows that the idle controller and the limiter operate in opposite directions. For this reason, the value 1 is selected as input signal because the integrator 200 is permitted to change in the positive direction (from a negative value in the direction of the value zero) so that the limiting action vanishes.

The value −1 is supplied when a limiting is to take place or no interaction with the integrator with the idle controller is to be feared. If this condition is present, the integrator generates an output signal which amplifies the limiting action because the value of the output signal is greater and therefore the desired value is reduced (DMUR is negative). This effect is only achieved when one of the conditions of the signal B_URP is not present because otherwise the value 1 is supplied to the integrator.

An initialization of the integrator 200 with the value 0 is undertaken when the engine rpm lies below a limit rpm for a specific duration. This limit rpm lies between the limit rpm NS and the maximum steady-state idle rpm.

The output quantity of the integrator 200 is supplied to a multiplier 220 wherein the integrator value is multiplied by the output quantity KLFUR of a characteristic field 222.

Figure 4:
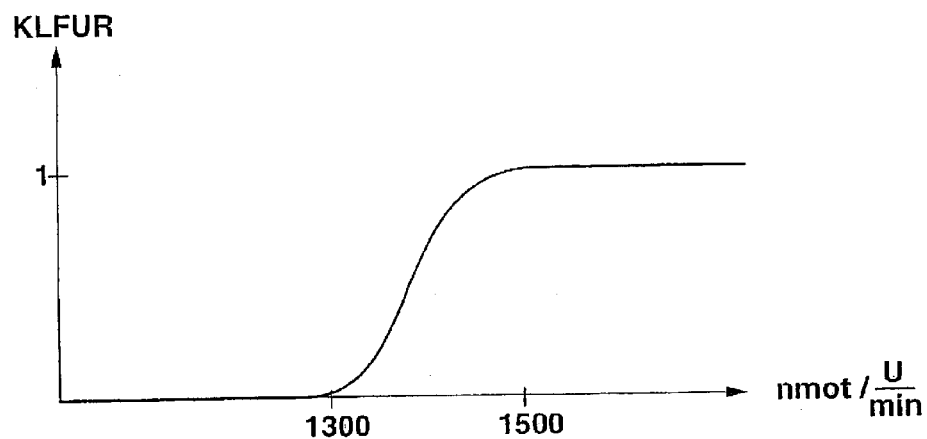
FIG. 4 shows an example for an rpm-dependent characteristic line which contributes to the separation of the effectiveness areas of idle controller and limiter.
Figure 5:
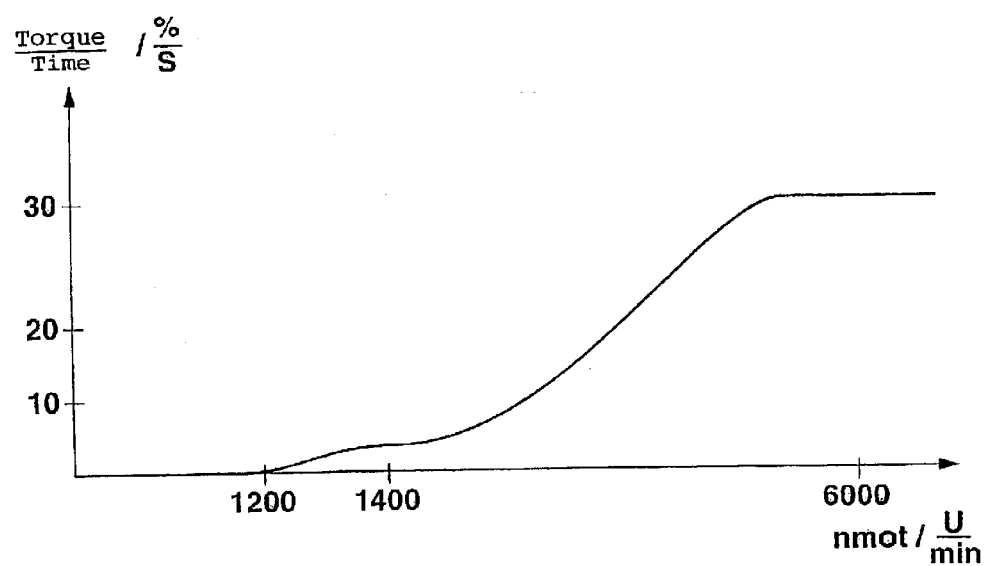
FIG. 5 shows a graph of torque plotted as a function of engine rpm.

This characteristic line is dependent upon the engine rpm and defines an engine rpm-dependent weighting factor. This weighting factor can assume values between 0 and 1. In FIG. 4, the trace of the corrective factor KLFUR is plotted as a function of the engine rpm by way of example. In this example, the corrective factor is 0 below 1300 revolutions per minute, that is, in the idle rpm range, and then increases up to the monitoring rpm of 1500 revolutions per minute continuously to the value 1. The rpm value below which the corrective factor has the value 0 can be that rpm at which an initialization of the integrator 200 takes place when the rpm value drops below.

If the engine rpm accordingly lies in the idle rpm range, wherein the corrective factor is 0, then the integrator value is multiplied by the value zero in the multiplier 220 so that the output signal DMUR is likewise 0. In this rpm range, the idle rpm controller is exclusively active. Above this rpm range, the weighting factor increases constantly so that the output signal DMUR of the limiter increases in effect and so the limiting effect increases, as may be required, with increasing rpm. In this way, a mutually countering operation of the idle controller and the limiter is substantially precluded.

In a further embodiment, the relationship of the engine rpm to the limit rpm (limiting rpm) is sufficient for switching the switching elements 216 and 218.

The above-described limiter is used in combination with the control of internal combustion engines as well as with other drive concepts, for example, electric motors. Furthermore, the use of the described solution is not limited to a torque-oriented control structure but it is also used in other environments (control on the plane of the power values, other torque values, throttle flap angle, et cetera).

What is claimed is:

1. A method for controlling the drive unit of a vehicle, the method comprising the steps of:

detecting at least the rpm of said drive unit;

controlling said drive unit in at least one operating state so that the engine rpm of said drive unit does not exceed a pregiven limit rpm;

providing a limiter which is active in said at least one operating state of said drive unit;

causing said limiter to output a corrective value for a control variable of said drive unit in said at least one operating state in dependence upon said rpm; and, controlling said corrective value to be ineffective in dependence upon at least an additional operating variable.

2. The method of claim 1, wherein the at least one additional operating variable is the engine rpm and the effectiveness of the corrective value is dependent upon rpm; and, for rpms below a pregiven rpm in the idle rpm range, the corrective value has no effect.

3. The method of claim 2, wherein the effectiveness of the corrective value increases constantly in the rpm range between the pregiven rpm and the limit value.

4. The method of claim 1, wherein the at least one additional operating variable is the operating state of a driving comfort function and the limiter is controlled to be ineffective when this function is active.

5. The method of claim 1, wherein the limiter contains a controllable integrator whose mode of operation is switchable in dependence upon operating conditions.

6. The method of claim 5, wherein the minimum limit value of the integrator is formed in dependence upon the engine rpm and an input value for the torque of the drive unit.

7. The method of claim 5, wherein the minimum value is 0 when: a comfort function is active, the fuel metering to the engine is switched off or the accelerator pedal is not in its idle position.

8. The method of claim 6, wherein the minimum value is 0 when: a comfort function is active, the fuel metering to the engine is switched off or the accelerator pedal is not in its idle position.

9. The method of claim 1, wherein an output signal of the limiter is an output signal of an integrator whose value changes in a first direction when at least the engine rpm is below the desired rpm of the idle controller and the limit rpm, the value of the output signal changes in the other direction when this condition is not present and at least the rpm lies above the limit rpm whereas, otherwise, the integrator is disabled.

10. The method of claim 1, wherein an output value of the limiter is superposed on a pregiven value for a torque for controlling the drive unit.

11. The method of claim 4, wherein the driving comfort function is a dashpot function.

12. A method for controlling the drive unit of a vehicle, the method comprising the steps of:

detecting at least the rpm of said drive unit;

controlling said drive unit in at least one operating state so that the engine rpm of said drive unit does not exceed a pregiven limit rpm;

providing a limiter which is active in said at least one operating state of said drive unit;

causing said limiter to output a corrective value for a control variable of said drive unit in said at least one operating state in dependence upon said rpm;

controlling the effectiveness of said corrective value in dependence upon at least an additional operating variable; and, wherein the at least one additional operating variable is the operating state of the fuel switchoff in overrun operation and that the corrective value is controlled to be ineffective when this function is active.

13. An arrangement for controlling the drive unit of a vehicle, the arrangement comprising a control unit which detects at least the rpm of the drive unit and which forms an output signal for controlling the drive unit and which control unit includes a limiter, which, in at least one operating state, so influences the output signal that the motor rpm is limited to a pregiven limit rpm; wherein, in at least one operating state, the limiter outputs a corrective value for a control variable of said drive unit in dependence upon the rpm and the corrective value is controlled to be ineffective in dependence upon at least an additional operating variable.

* * * * *